United States Patent
Kennedy et al.

(10) Patent No.: US 9,363,940 B2
(45) Date of Patent: Jun. 14, 2016

(54) SEED PANEL

(71) Applicant: UFPTechnologies, Inc., Georgetown, MS (US)

(72) Inventors: Gregory Kennedy, San Buenaventura, CA (US); David Stewart, El Paso, TX (US); Maura Galligan, West Newbury, MA (US)

(73) Assignee: UFP TECHNOLOGIES, INC., Georgetown, MA (US)

( * ) Notice: Subject to any disclaimer, the term of this patent is extended or adjusted under 35 U.S.C. 154(b) by 365 days.

(21) Appl. No.: 13/841,972

(22) Filed: Mar. 15, 2013

(65) Prior Publication Data
US 2013/0269248 A1   Oct. 17, 2013

Related U.S. Application Data

(60) Continuation-in-part of application No. 13/796,016, filed on Mar. 12, 2013, now abandoned, which is a division of application No. 13/206,857, filed on Aug. 10, 2011, now abandoned.

(60) Provisional application No. 61/372,696, filed on Aug. 11, 2010.

(51) Int. Cl.
*A01C 1/04*  (2006.01)
*B32B 38/10*  (2006.01)
(Continued)

(52) U.S. Cl.
CPC .............. *A01C 1/044* (2013.01); *A01G 9/026* (2013.01); *A01G 9/10* (2013.01); *B32B 38/10* (2013.01)

(58) Field of Classification Search
CPC ............................... A01C 1/042; A01C 1/044

USPC .................................. 47/14, 15, 56; 111/199
See application file for complete search history.

(56) References Cited

U.S. PATENT DOCUMENTS 2,281,927 A   5/1942   Fischer
3,098,320 A   7/1963   Estkowski et al.
(Continued)

FOREIGN PATENT DOCUMENTS

DE   29815809 U1   12/1998
DE   20214508 U1   2/2004
(Continued)

OTHER PUBLICATIONS

Offer for Sale of a fold up CD sleeve with laminated low-grow wild flower mix seed panel, Aug. 6, 2009, 1 page.
(Continued)

*Primary Examiner* — Trinh Nguyen
(74) *Attorney, Agent, or Firm* — Howard & Howard Attorneys PLLC (57) ABSTRACT

A method of forming a plantable structure involves providing a substrate element, a release layer spaced from the substrate element, an adhesive layer disposed between the substrate element and the release layer, and at least one seed abutting the adhesive layer. The seed(s) is/are coupled to the substrate element through the adhesive layer. The method further comprises removing the release layer from the composite article, and adhering a remaining portion of the composite article to a secondary article. The remaining portion of the secondary article comprises the substrate element, the adhesive layer disposed on the substrate element, and the seed(s) abutting the adhesive layer. Also disclosed herein are a method of planting at least one seed with a composite article, a packaging structure, a method of forming a packaging structure, and a method of planting at least one seed.

11 Claims, 12 Drawing Sheets

(51) Int. Cl.
*A01G 9/10* (2006.01)
*A01G 9/02* (2006.01)

(56) References Cited

U.S. PATENT DOCUMENTS

| | | | |
|---|---|---|---|
| 3,098,321 A | 7/1963 | Estkowski | |
| 3,659,396 A | 5/1972 | Baker | |
| 3,908,308 A | 9/1975 | Meyers | |
| 4,080,755 A | 3/1978 | Crosby | |
| 4,173,844 A | 11/1979 | Knolle et al. | |
| 4,272,919 A | 6/1981 | Schmidt | |
| 4,353,183 A | 10/1982 | Estkowski | |
| 4,418,497 A | 12/1983 | Mastriano | |
| 4,442,627 A | 4/1984 | Adams et al. | |
| 5,210,975 A | 5/1993 | Beckerman | |
| 5,239,774 A | 8/1993 | Rickabaugh | |
| 5,417,010 A | 5/1995 | Ecer | |
| 5,720,129 A | 2/1998 | Lantinberg | |
| 5,771,614 A | 6/1998 | Dawson | |
| 6,240,674 B1 | 6/2001 | Otake et al. | |
| 6,684,561 B2 | 2/2004 | Poret et al. | |
| 6,701,664 B2 | 3/2004 | Ahm | |
| 6,792,714 B1 | 9/2004 | Lyons | |
| 6,945,785 B2 | 9/2005 | Sohl et al. | |
| 7,438,224 B1 | 10/2008 | Jensen et al. | |
| 7,641,112 B2 | 1/2010 | Jensen et al. | |
| 7,735,250 B2 | 6/2010 | Menzie et al. | |
| 2002/0000064 A1 | 1/2002 | D'Agnone et al. | |
| 2002/0040670 A1 | 4/2002 | Hornak | |
| 2006/0107561 A1 | 5/2006 | Menzie et al. | |
| 2006/0162248 A1* | 7/2006 | Ahm | 47/56 |
| 2008/0046277 A1 | 2/2008 | Stamets | |
| 2010/0006461 A1 | 1/2010 | Shaffer et al. | |
| 2011/0302835 A1* | 12/2011 | Ray et al. | 47/56 |

FOREIGN PATENT DOCUMENTS

| | | |
|---|---|---|
| FR | 2584983 A1 | 1/1987 |
| FR | 2707832 A1 | 1/1995 |
| GB | 2281713 A | 3/1995 |
| GB | 2304624 A | 3/1997 |
| GB | 2460413 A | 12/2009 |
| JP | 2227296 A | 9/1990 |
| WO | 94/16907 A1 | 8/1994 |
| WO | 2007/050282 A3 | 5/2007 |
| WO | 2009156855 A2 | 12/2009 |

OTHER PUBLICATIONS 7-11 Slurpee Coins on Apr. 7, 2010 using Internet <URL:http://www.ericscards.com/coins>, 1 page.
Bloomin' Promotions on Apr. 7, 2010 using Internet <URL:http://www.bloominpromotions.com/cupcooler.html>, 1 page.
Botanical Paperworks on Apr. 7, 2010 using internet <URL:http://www.botanicalpaperworks.com>, 1page.
Flower Seed Paper on Apr. 7, 2010 using Internet <URL:http://www.flowerseedpaper.com>, 2 pages.
Green Field Paper Company on Apr. 7, 2010 using Internet <URL:http://www.greenfieldpaper.com>, 5 pages.
English Language Abstract for DE 296 15 809 U1 extracted from the espacenet.com database on Oct. 6, 2011, 8 pages.
English language abstract and machine-assisted translation for German Patent No. DE 202 14 508 U1 extracted from the espacenet.com database on Jun. 12, 2013, 12 pages.
English language abstract and machine-assisted translation for French Patent No. FR 2 584 983 A1 extracted from the espacenet.com database on Jun. 12, 2013, 10 pages.
English language abstract and machine-assisted translation for French Patent No. FR 2 707 832 A1 extracted from the espacenet.com database on Jun. 12, 2013, 15 pages.
English Language Abstract for JP 2-227296 A extracted from the espacenet.com database on Oct. 6, 2011, 8 pages.

* cited by examiner

SEED PANEL

CROSS REFERENCE TO RELATED APPLICATION

This application is a continuation-in-part of U.S. patent application Ser. No. 13/796,016, filed on Mar. 12, 2013, which is a divisional application of U.S. patent application Ser. No. 13/206,857, filed on Aug. 10, 2011, which claims the benefit of U.S. Provisional Patent Application Ser. No. 61/372,696, filed on Aug. 11, 2010, the disclosures of which are hereby incorporated by reference in their entirety.

BACKGROUND

1. Field of the Invention

The subject invention relates to a composite article and more specifically to a composite article including seed for planting.

2. Description of the Related Art

Supplying plantable seeds with products is generally known in the art. Many of these products include different types of seeds embedded therein. For example, various articles formed from paper and/or fibers, such as greeting and transactional cards, have seeds integrated within the paper/fibers themselves. Alternatively, removable portions or decorative elements that include seeds embedded therein may be used to adorn the cards. Still other examples of similar products include dishes and cutlery having seeds embedded therein.

Typically, to plant the seeds, the entire card or product may be planted. However, planting an entire card or product is generally not desirable because the message or information disposed on the card will be lost. Moreover, even if only a portion of the card or product contains the seeds to be planted, the material surrounding the seeds must break down before the seeds are able to germinate. Thus, planting an entire card or product is not desirable. Additionally, waiting for the material surrounding the seed to break down may delay or even prevent the seeds from ever germinating. Accordingly, there remains an opportunity to develop an improved article including seeds.

SUMMARY

Disclosed herein is a method of forming a plantable structure. The method comprises providing a substrate element, a release layer spaced from the substrate element, an adhesive layer disposed between the substrate element and the release layer, and at least one seed abutting the adhesive layer. The seed(s) is/are coupled to the substrate element through the adhesive layer. The method further comprises removing the release layer from the composite article, and adhering a remaining portion of the composite article to a secondary article. The remaining portion of the secondary article comprises the substrate element, the adhesive layer disposed on the substrate element, and the seed(s) abutting the adhesive layer.

A method of planting at least one seed with a composite article is also disclosed herein. The composite article comprises a substrate element, a release layer spaced from the substrate element, an adhesive layer disposed between the substrate element and the release layer, and the seed(s) coupled to the substrate element through the adhesive layer. The method comprises removing the release layer from the composite article, adhering a remaining portion of the composite article to a secondary article, and disposing the secondary article having the remaining portion of the composite article adhered thereto in or on a growing medium to plant the seed(s). The remaining portion of the composite article comprising the substrate element, the adhesive layer disposed on the substrate, and the seed(s) abutting the adhesive layer.

A packaging structure is also disclosed herein. The packaging structure comprises a structural element comprising a first piece at least partially overlapping a second piece, an adhesive layer disposed between the first and second pieces to join the first and second piece to one another, and at least one seed disposed between the first and second pieces and abutting the adhesive layer. The first piece is separable from the second piece to expose the seed(s).

A method of forming a packaging structure comprises providing a first and a second piece of a structural element, applying an adhesive layer to the second piece of the structural element, applying at least one seed to the adhesive layer, and applying the first piece of the structural element to the adhesive layer, thereby encapsulating the seed(s).

A method of planting at least one seed is also disclosed. The method comprises providing a packaging structure that comprises a structural element comprising a first piece at least partially overlapping a second piece, an adhesive layer disposed between the first and second pieces to join the first and second piece to one another, and at least one seed disposed between the first and second pieces and abutting the adhesive layer. The first piece is separable from the second piece to expose the seed(s). The method further comprises removing the first piece from the packaging structure to expose the seed(s). The method further comprises detaching the second piece from the packaging structure, where the second piece has the adhesive layer disposed thereon and the seed(s) abutting the adhesive layer. The method still further comprises disposing the second piece in a growing medium to plant the seed(s).

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION

Referring to the Figures, wherein like numerals indicate like or corresponding parts throughout the several views an article comprising one or more seeds is generally shown at 20. The article 20 is further defined as a seed panel 20 and will hence forth be described as the seed panel 20.

Figure 1:
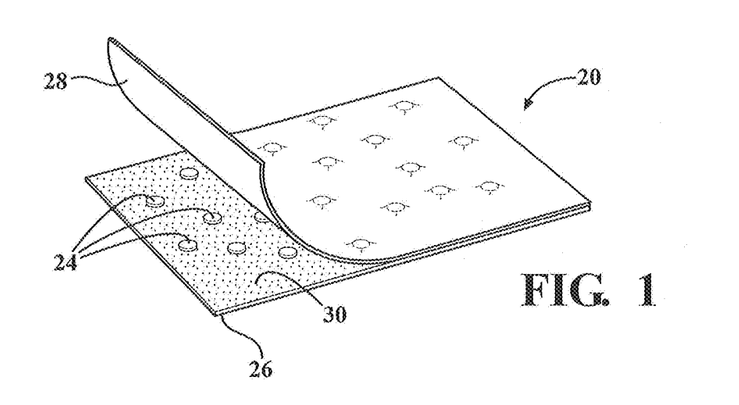
FIG. 1 is a perspective view of a seed panel with a cover element partially peeled off to expose a plurality of seed.
Figure 3:
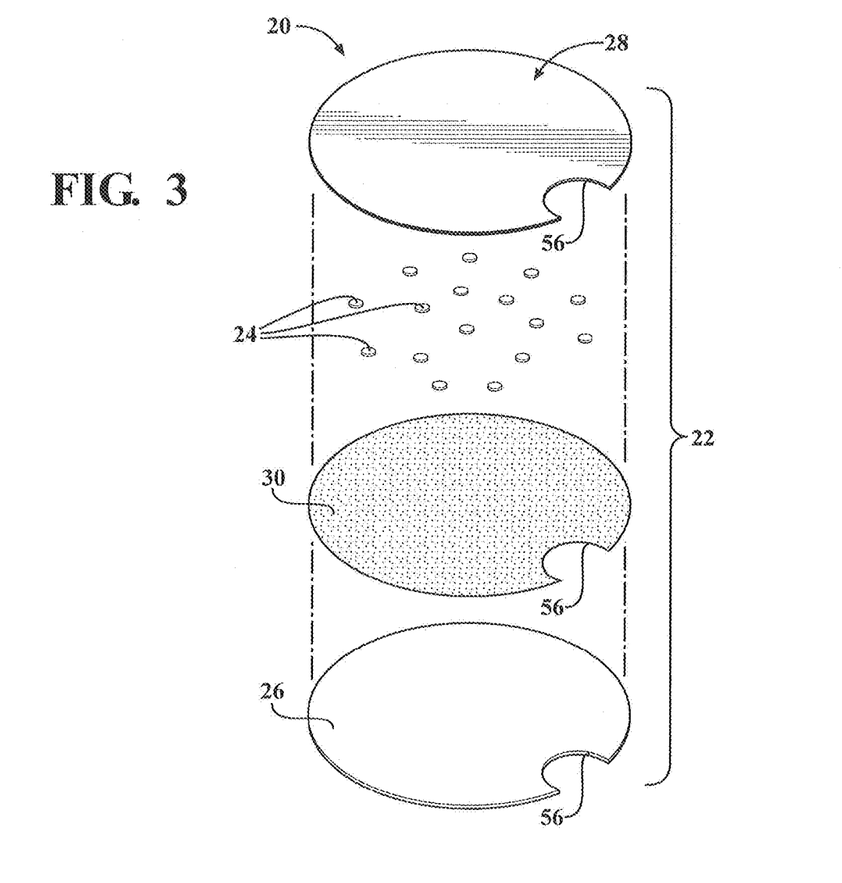
FIG. 3 is an exploded perspective view of another embodiment of the seed panel.
Figure 4:
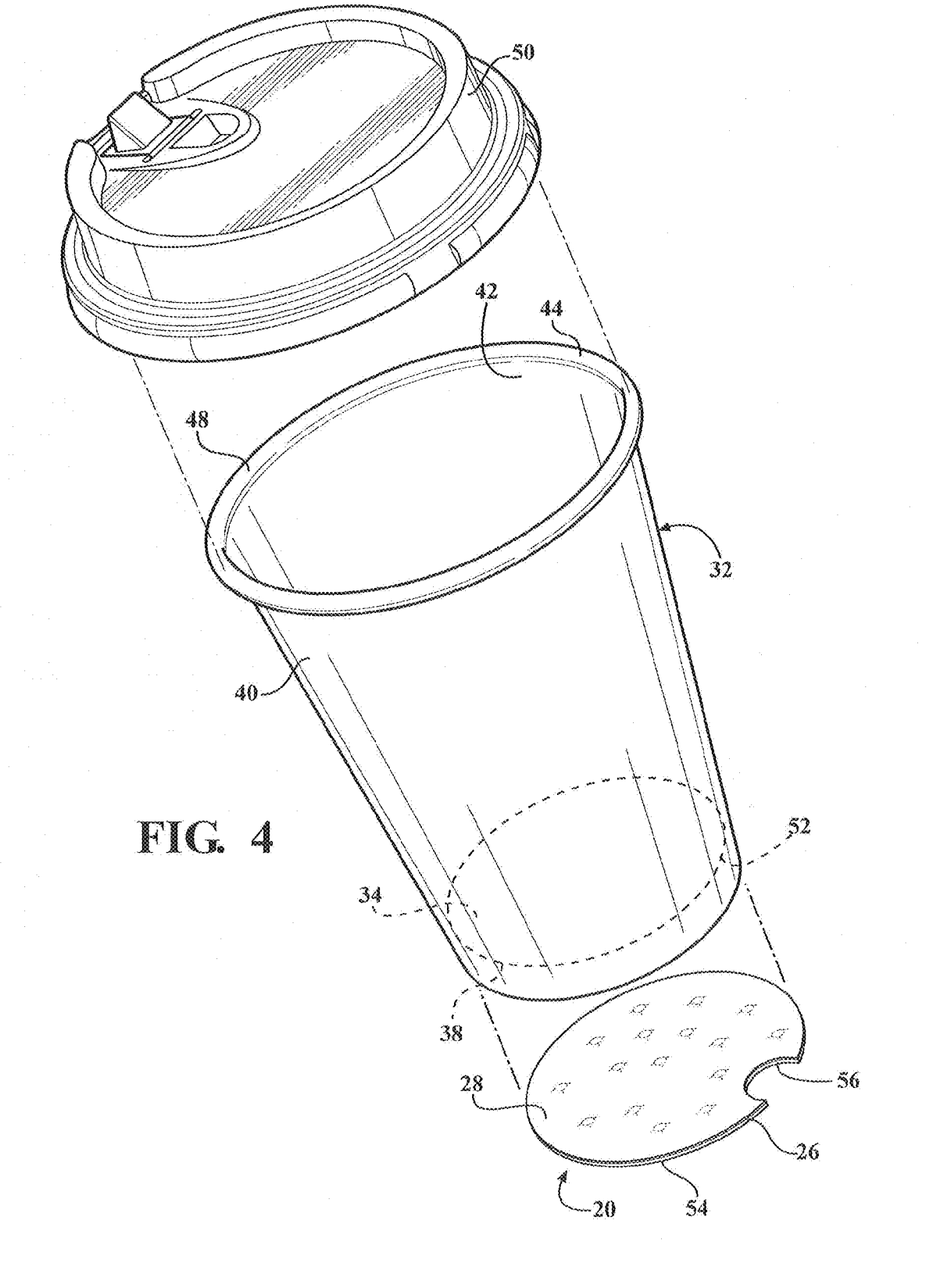
FIG. 4 is a perspective view of the seed panel spaced from a cup.

With reference to FIGS. 1 and 3, the seed panel 20 is a multilayered structure comprising a plurality of layers 22. The layers 22 are further defined as a seed layer 24, a substrate element 26, an adhesive layer 30, and a cover element 28. The seed panel 20 typically includes at least one of each of the layers 22. However, the number of layers 22 is not particularly limited, such that the seed panel 20 may include a plurality of any or all of the layers 22. Any of the layers 22 may completely cover or extend beyond adjacent layers 22. Alternatively, any of the layers 22 may only cover or be in contact with a portion of adjacent layers 22.

For clarity purposes, as used herein, the term "seed" refers to one seed or a plurality of seeds. The seed layer 24 typically includes a plurality of seeds; however use of a single seed will not deviate from the scope of this disclosure. It should be noted that the seed is not limited to any particular type of seed. The seed panel 20 may comprise one or a plurality of the same type of seed. Alternatively, the seed panel 20 may include a variety of different types of seed. The seed may include, but is not limited to, flower seed, herb seed, grass seed, fruit seed, vegetable seed, and combinations thereof. The type of seed utilized may depend upon the size, shape, or function of the seed panel 20. The seed is typically spaced from one another in a random, non-contiguous manner within the seed panel 20. Alternatively, the seed may be arranged in a contiguous layer such that the seed abut one another on the seed panel 20.

The seed panel 20 may define any configuration or size related to a desired application. The seed panel 20 of the present disclosure may be utilized in a variety of applications. The seed panel 20 may be affixed to or otherwise coupled to a secondary article. Examples of the secondary article includes, but is not limited to, cup bottoms, book marks, business cards, cartons, boxes, envelopes, compact disc (CD) sleeves, packaging, bottle hang tags, price tags, other die cut components, or any other application. Alternatively, the seed panel 20 may itself be one of the aforementioned articles. In other words, the seed panel 20 may be integrated into the article itself. Both alternatives will be explained in greater detail below.

The substrate element 26 is typically a semi-rigid material and tends to be environmentally friendly, i.e., biodegradable, meaning that the substrate element 26 will tend to biodegrade. Examples of suitable materials for the substrate element 26 include, but are not limited to, fiberboard, cardboard, cardstock, paper, fibers, recycled newsprint, and combinations thereof, or the like. However, the substrate element 26 may comprise a plastic, a metal, a paper, a polymer, and the like. Additionally, the substrate element 26 may comprise a flexible or pliable material without deviating from the scope of the present disclosure.

The adhesive layer 30 is typically disposed on the substrate element 26. As used herein, the terminology "disposed on" describes the adhesive layer 30 being in direct contact with the substrate element 26, or spaced from the substrate element 26. In an example, the adhesive layer 30 is a pressure-sensitive adhesive. In another example, the adhesive is a water-based adhesive. However, any other suitable adhesive may also be employed. The adhesive layer 30 is not particularly limited and may include a solid, a gel, or a liquid adhesive. Further the adhesive layer 30 may be a sheet, a film, a gum, or any other structure. Additionally, the adhesive layer 30 may be defined as glue, paste, cement, plaster or the like. The adhesive layer 30 also tends to be environmentally friendly, i.e., biodegradable, meaning that the adhesive will tend to biodegrade. The adhesive layer 30 is typically organic. However it is to be appreciated that the adhesive layer 30 may include one or more silicones without deviating from the scope of this disclosure.

The adhesive layer 30 typically couples the seed layer 24 to the substrate element 26. The seed layer 24 is not necessarily in direct contact with the substrate element 26. The seed layer 24 may be spaced from the substrate layer. The seed layer 24 typically extends from the adhesive layer 30 and away from the substrate layer. Alternatively, the seed layer 24 may be applied to the substrate element 26 prior to the adhesive layer 30 such that the seed layer 24 is in contact with the substrate element 26 and the adhesive layer 30 is applied over the seed layer 24 for coupling the seed layer 24 to the substrate element 26. In other words, the seed layer 24 may extend from the adhesive layer 30 and toward the substrate layer. At least a portion of each seed of the seed layer 24 remains free of the adhesive layer 30. A portion of each seed within the seed layer 24 is exposed when the substrate element 26 and/or the cover element 28 is removed.

The cover element 28 is disposed on the substrate element 26 and over the seed layer 24 and the adhesive layer 30 for protecting the seed layer 24 from damage and to help the seed layer 24 remain secured to the substrate element 26. The cover element 28 is typically coupled to the substrate element 26 through the adhesive layer 30 in areas not occupied by the seed layer 24. It is to be appreciated that the cover element 28 need not be the outer most layer of the seed panel 20 such that additional layers 22 may be disposed on or over the cover element 28. The cover element 28 may be further defined as a release layer, a release coating, a release paper, wax paper, fiberboard, or any suitable material that will allow the cover element 28 to be separated from the substrate element 26 for exposing the seed layer 24. The term "separated" includes peeling, prying, tearing, or otherwise detaching the cover element 28 and the substrate element 26. In various embodiments, the cover element 28 includes one or more silicones including, but not limited to, polydimethylsiloxanes, organopolysiloxanes, and the like. Alternatively, the cover element 28 may include organic and/or inorganic materials. The cover element 28 may also comprise a biodegradable material.

In an example the cover element 28 is a release layer designed to be removed from the composite article. The release layer comprises a material that will enable the release layer to be readily separated from the adhesive layer 30 and removed from the composite article. In an example, the release layer is made from a coated paper product. The coated paper product may, for instance, comprises paper (such as cellulose-based papers and polymer-based papers) coated with at least one silicone.

Figure 2:
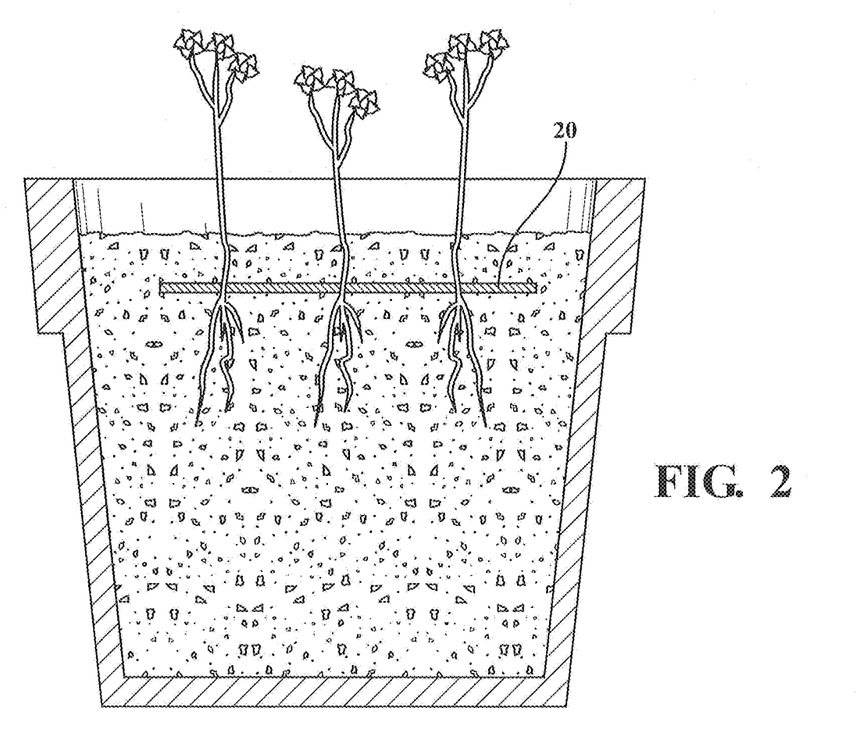
FIG. 2 is a partially cross-sectioned view of the seed panel planted for germinating the seed.

As discussed above, the seed panel 20 may define any shape and is not particularly limited in size. Typically, size and shape are related to the desired application of the seed panel 20. The cover element 28 may be peeled away (or may be peelable) from the substrate element 26 for exposing the seed layer 24 adhered thereto. With the seed layer 24 exposed, the seed panel 20 may be planted for germinating the seed of the seed layer 24, as shown in FIG. 2. Alternatively, when the cover element 28 is removed, thereby exposing the adhesive layer 30, the substrate element 26 and the seed layer 24 may be coupled to the secondary article or another structure via the adhesive layer 30.

FIGS. 3-7 illustrate one exemplary embodiment of the seed panel 20. In this embodiment, the seed panel 20 is adapted to be coupled to a cup 32 having a recessed bottom. The cup 32 is not particularly limited and is typically formed from a paper composition for use with hot beverages, such as coffee, tea, cocoa, or the like. However, it should be appreciated that the cup 32 may be used to house any type of substance, including hot and cold beverages or any other substance such as, but not limited to, oatmeal, soup, cold cereal or a non-edible substance. The cup 32 may define any shape and size. The cup 32 typically includes a generally horizontal bottom wall 34 having an inner surface 36 and an outer surface 38 spaced from the inner surface 36. The cup 32 typically has a peripheral wall 40 that is disposed about the bottom wall 34 and that defines a chamber 42 for housing the substance. The peripheral wall 40 includes an upper end 44 and a lower end 46. The upper end 44 defines an aperture 48 for filling and emptying the cup 32. A lid 50 may be placed over the aperture 48 to enclose the chamber 42 and prevent spillage of the beverage. However, the lid 50 is not required. The bottom wall 34 is proximately spaced from the lower end 46 of the peripheral wall 40 such that the peripheral wall 40 extends beyond the outer surface 38 of the bottom wall 34, and defines a cavity 52 between the lower end 46 and the outer surface 38, with the lower end 46 defining an orifice for accessing the cavity 52. In other words, the cavity 52 is not enclosed on all sides such that the cavity 52 has an "open" bottom. The cavity 52 is not particularly limited in size. When the cup 32 is placed on a relatively flat surface such as a table, a counter, or the like, the lower end 46 of peripheral wall 40 typically supports the cup 32.

Figure 5:
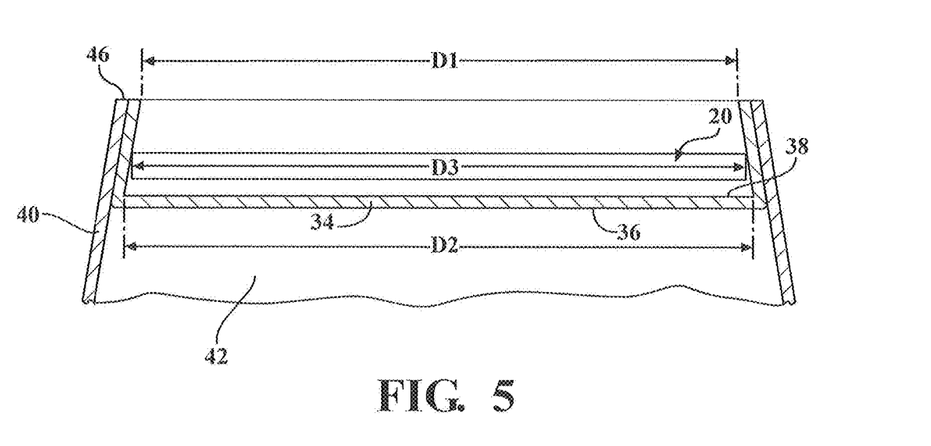
FIG. 5 is a cross-sectional side view of the seed panel disposed within a cup having a recessed bottom.

The cavity 52 typically defines a plurality of diameters between the outer surface 38 of the bottom wall 34 and the lower end 46, as best shown in FIG. 5. The peripheral wall 40 and the outer surface 38 are typically in an acute angular relationship with one another, such that the diameters defined by the peripheral wall 40 decreases, moving away from the bottom wall 34 and toward the lower end 46 of the peripheral wall 40. Said differently, the diameter defined by the peripheral wall 40 immediately adjacent the bottom wall 34 is typically larger than the diameter defined by the lower end 46 of the peripheral wall 40. The diameter defined by the lower end 46 of the peripheral wall 40 is further defined as a first diameter D1 and tends to be the smallest diameter defined by the peripheral wall 40 within the cavity 52. The diameter defined by the peripheral wall 40 immediately adjacent the bottom wall 34 is further defined as a second diameter D2 and tends to be the largest diameter defined by the peripheral wall 40 within the cavity 52.

When the seed panel 20 is adapted to be coupled to the cup 32, the seed panel 20 typically defines a configuration that is approximately complementary in shape to the cavity 52. The configuration has a perimeter 54, and the perimeter 54 defines a third diameter D3. The third diameter D3 tends to be less than the second diameter D2, but slightly larger than the first diameter D1 defined by the peripheral wall 40. An interference fit is created between the peripheral wall 40 and the seed panel 20 for securing the seed panel 20 within the cavity 52. In other words, the seed panel 20 is forced past the first diameter D1 and into the cavity 52 thereby securing the seed panel 20 therein. Alternatively, the seed panel 20 may be glued, fastened, or otherwise held in place. It is to be appreciated that the type of attachment of the seed panel 20 to the cup 32 is not particularly limited.

Figure 6:
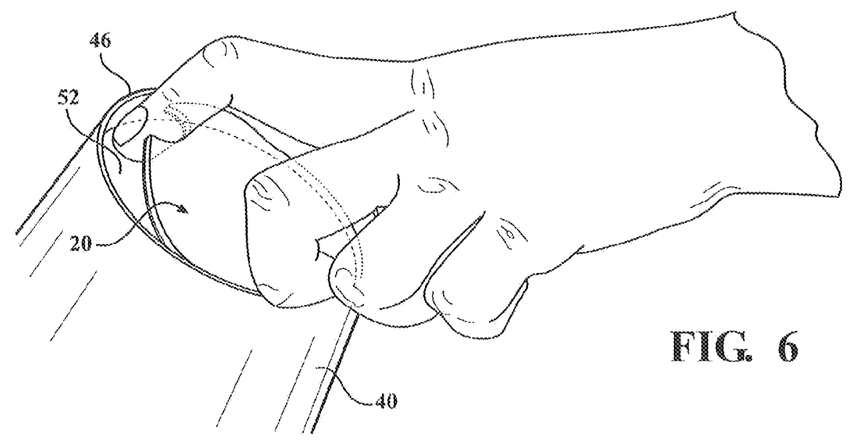
FIG. 6 is a perspective view of a seed panel being manually removed from the cup having a recessed bottom.
Figure 7:
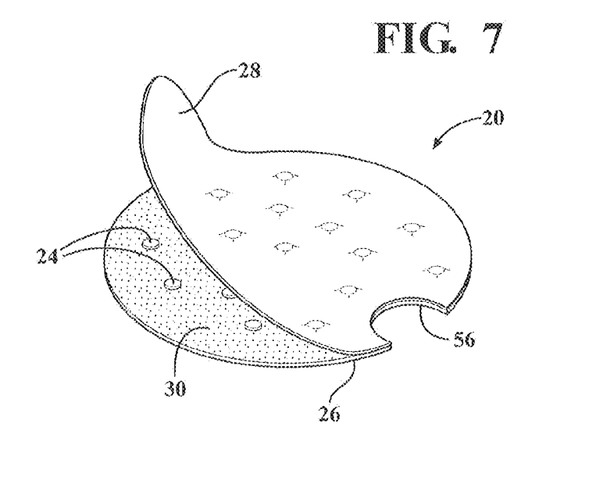
FIG. 7 is a perspective view of a seed panel of another embodiment with the cover element partially peeled off to expose a plurality of seed.

Additionally, the seed panel 20 may define a recess 56 along the perimeter 54 with the recess 56 typically defining a substantially semi-circular configuration. However, it is to be appreciated that the recess 56 is not particularly limited to a specific shape. As shown in FIG. 6, the recess 56 is typically used to remove the seed panel 20 from the cavity 52. A user may insert a finger, or a mechanical device, into the recess 56 to pry or pull the seed panel 20 away from the bottom wall 34, thereby freeing the seed panel 20 from the cavity 52 of the cup 32. After the seed panel 20 is removed from cup 32, the cover element 28 is peeled from the remaining layers 22 of the seed panel 20 for exposing the seed layer 24 in preparation for planting, as illustrated in FIG. 7.

Figure 8:
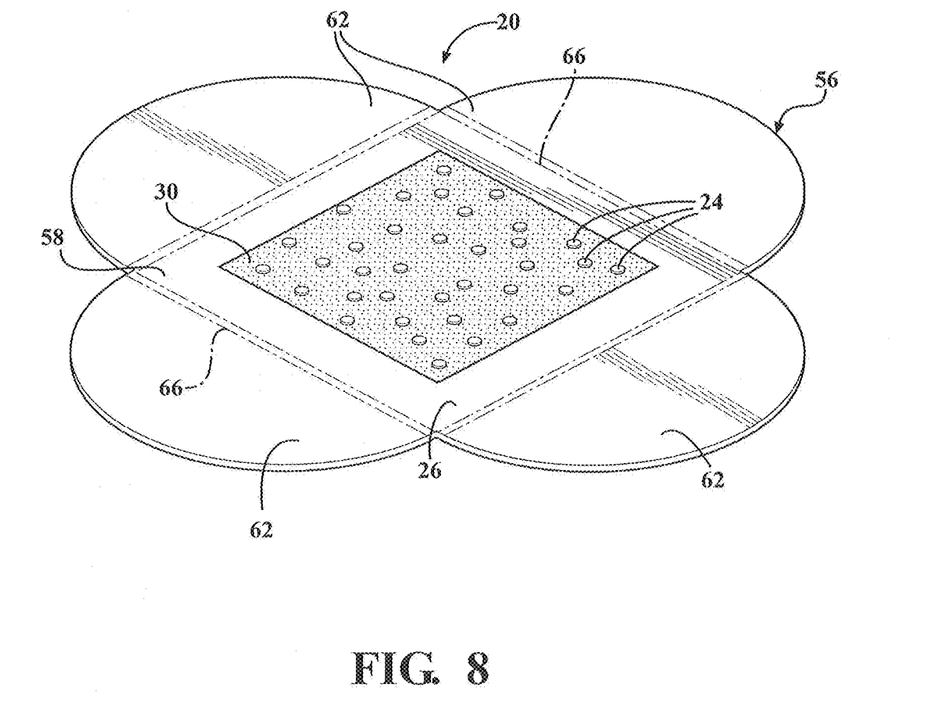
FIG. 8 is a perspective view of another embodiment of the seed panel with the cover element removed to expose a plurality of seeds.
Figure 9:
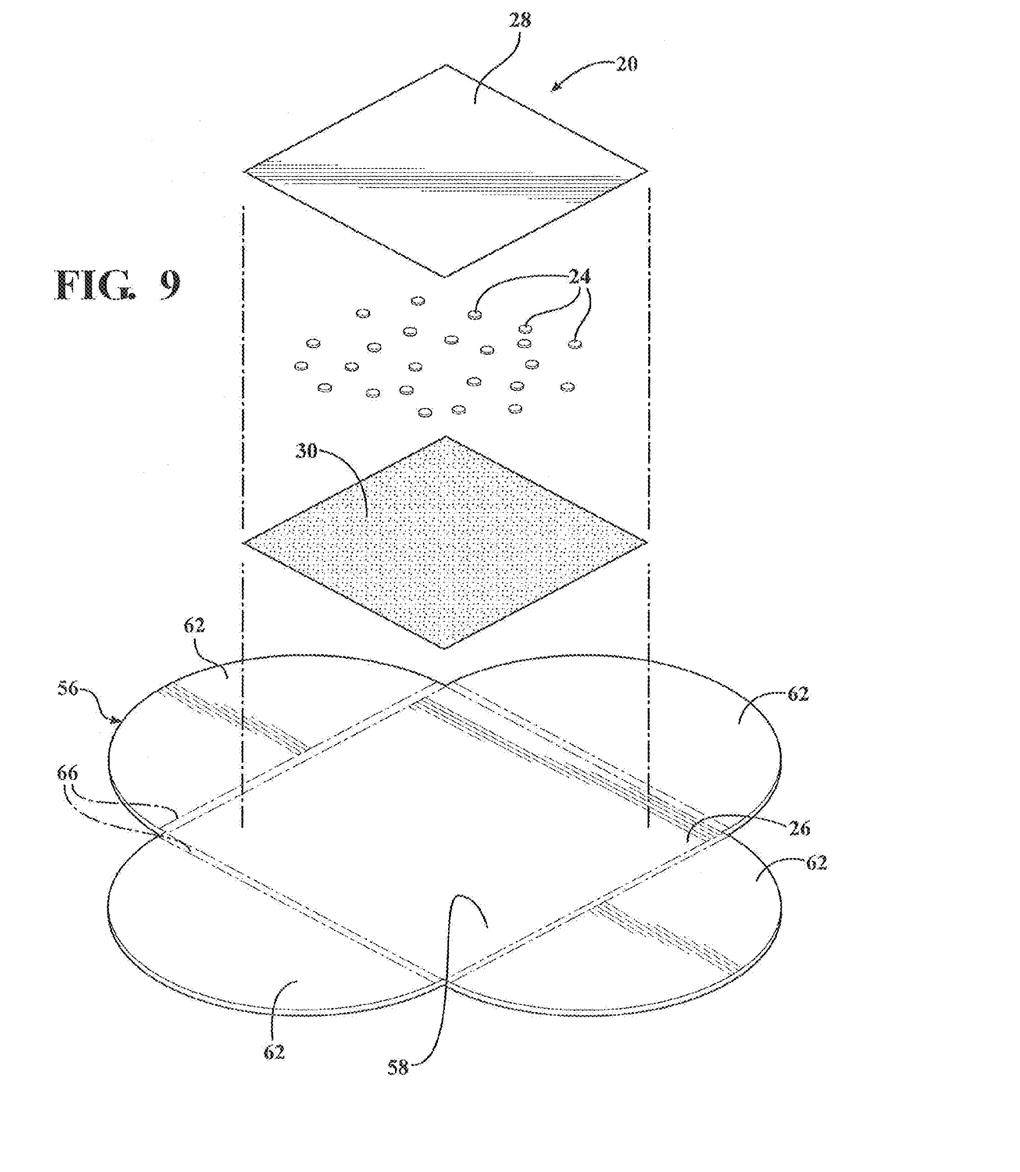
FIG. 9 is an exploded perspective view of another embodiment of the seed panel.

With reference to FIGS. 8 and 9, in another embodiment of the seed panel 20, the substrate element 26 may be larger than and extend beyond the other layers 22. Specifically, the substrate element 26 may be a packaging 58, such as, for example, a CD sleeve for protecting a compact disc. The packaging 58 comprises a base 60 and a plurality of wings 62 extending from the base 60. The adhesive layer 30 may be applied directly onto the base 60 for securing the seed layer 24 thereon. In this embodiment, the cover element 28 is removed for exposing the seed layer 24 and the remaining portions are planted. In other words, the packaging 58 is planted and is no longer used for protecting the compact disc.

Figure 10:
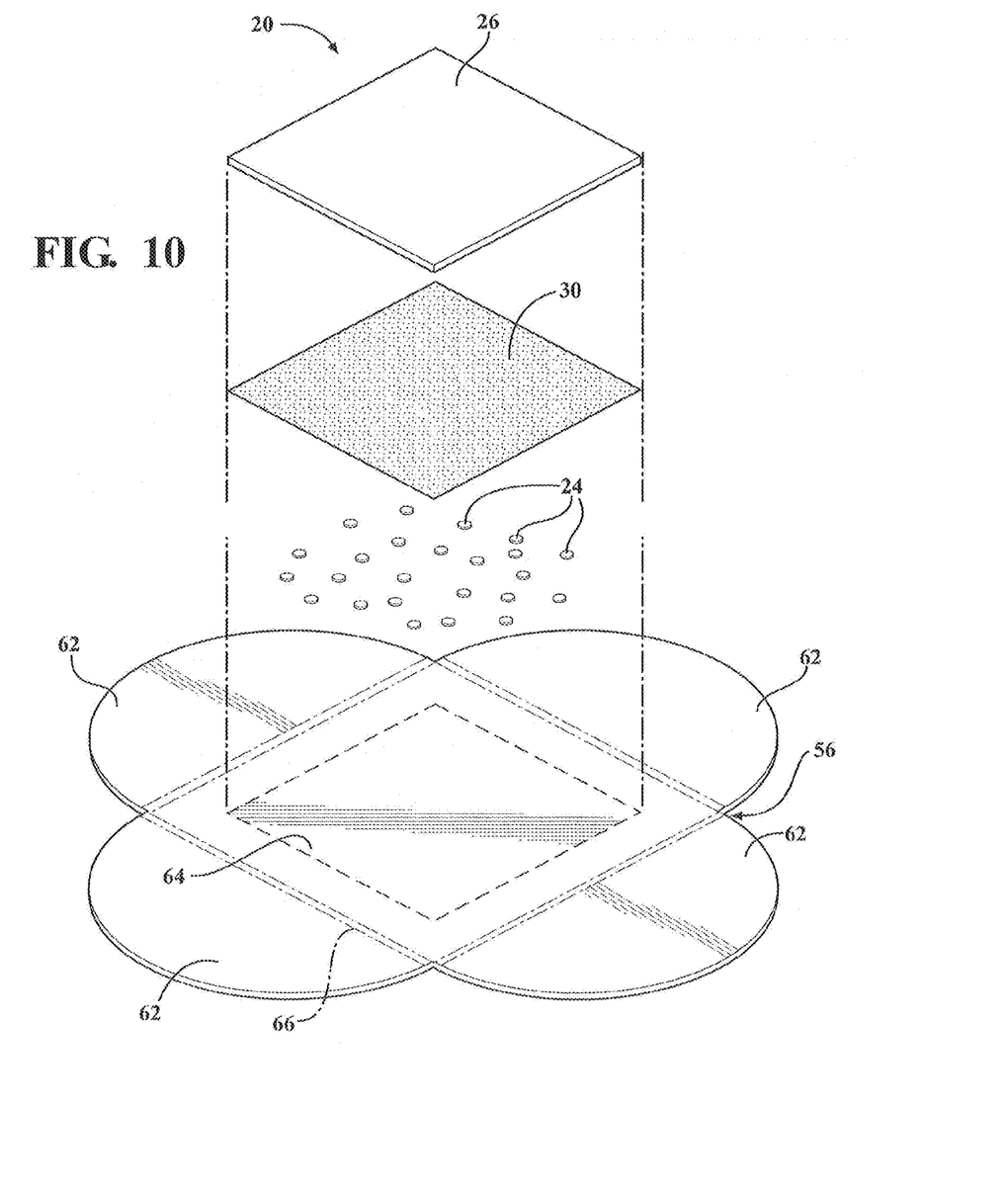
FIG. 10 is an exploded perspective view of another embodiment of the seed panel.

In yet another embodiment, shown in FIG. 10, the packaging 58 may include a release coating 64. The release coating 64 is illustrated with broken lines on the base 60 of the packaging 58. However, it is to be appreciated that the release coating 64 in not necessarily required. The adhesive layer 30 couples the seed layer 24 to the substrate layer and is configured to be peeled away or otherwise removable from the packaging 58 for exposing the seed layer 24. Said differently, in this embodiment the packaging 58 functions as the cover element 28 and the packaging may continue to be used for an intended purpose, e.g. protecting the compact disc.

Figure 11:
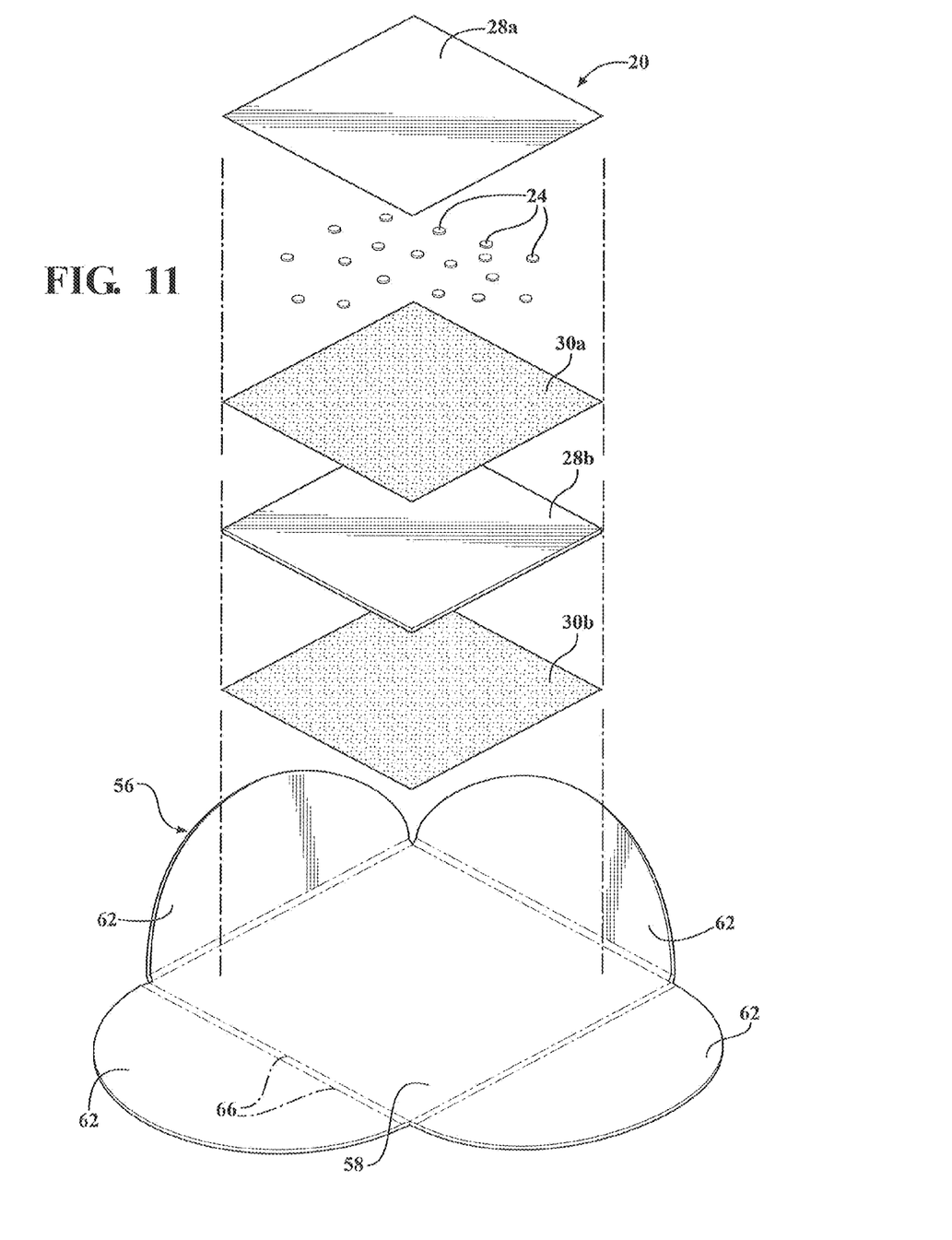
FIG. 11 is exploded perspective view of another embodiment of the seed panel.
Figure 12:
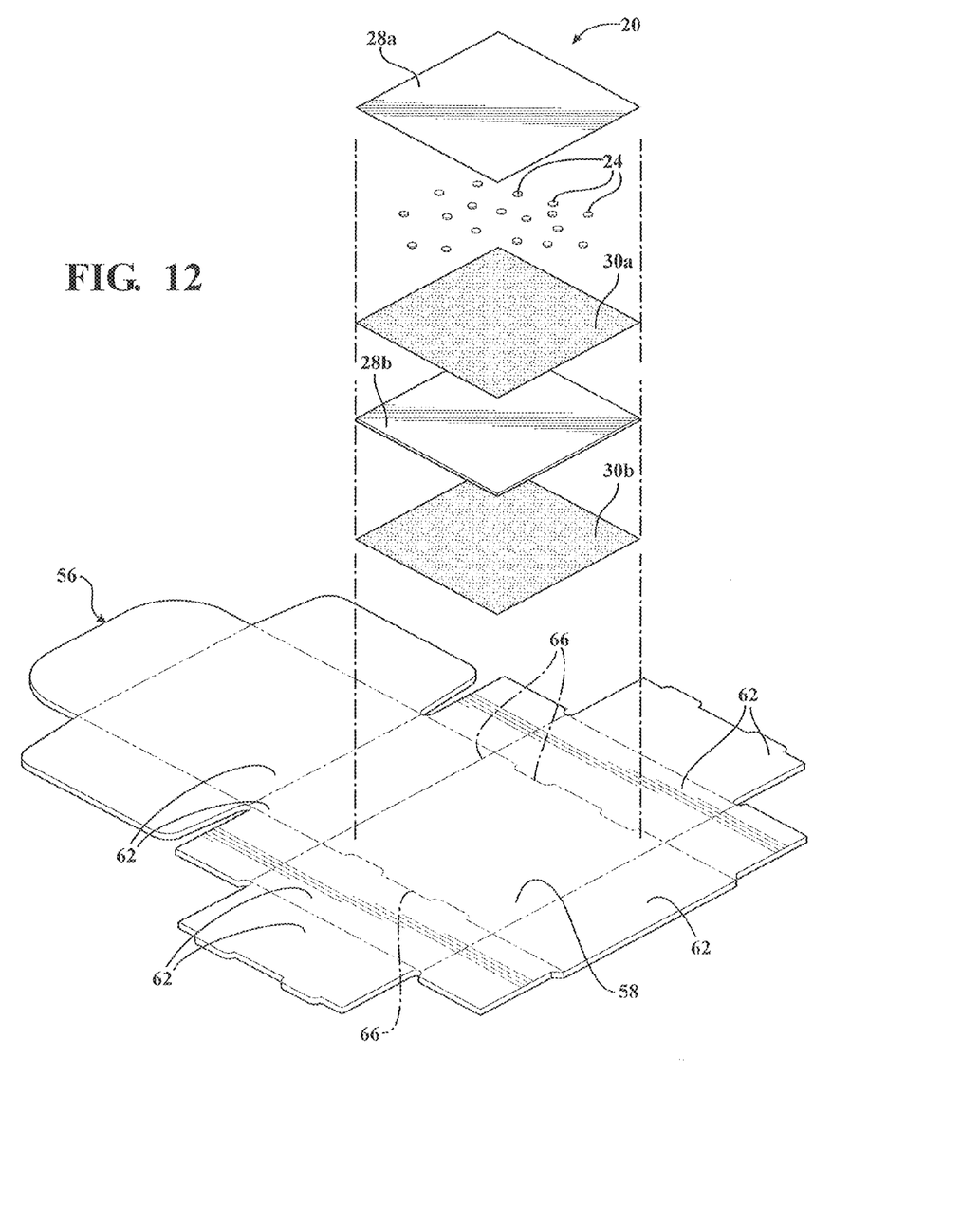
FIG. 12 is exploded perspective view of another embodiment of the seed panel.
Figure 13:
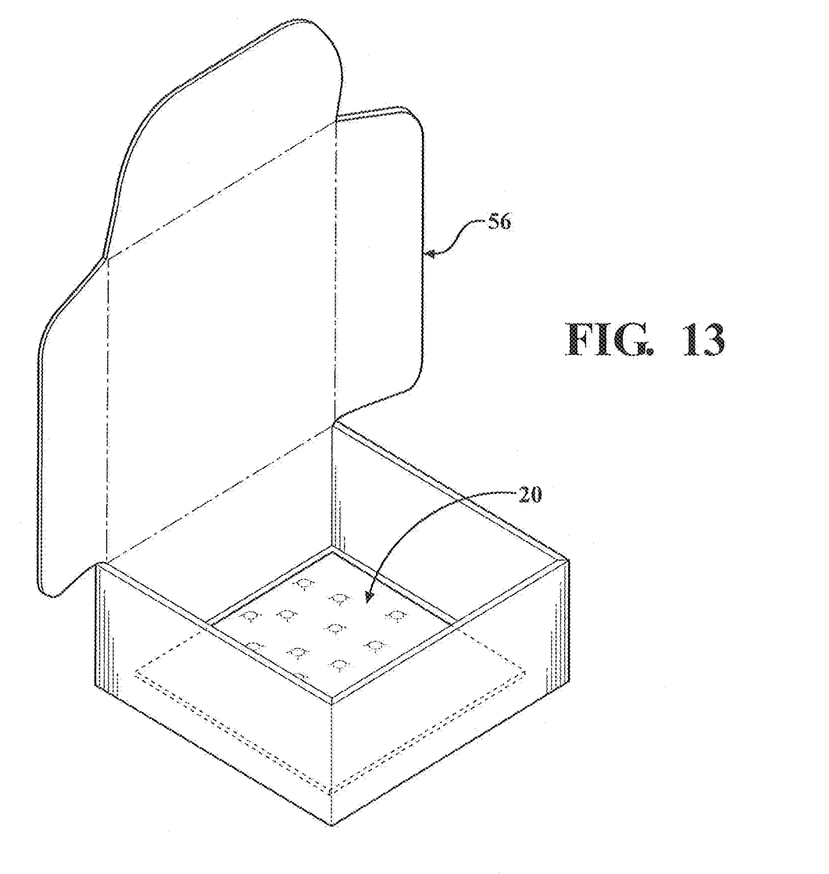
FIG. 13 is a perspective view of the seed panel disposed on packaging.

In still another embodiment, additional layers 22 may be added to the seed panel 20. With reference to FIGS. 11-13, the adhesive layer 30 may be further defined as a first adhesive layer 30a and a second adhesive layer 30b. Additionally, the cover element 28 may be further defined as a first cover element 28a and a second cover element 28b. In this embodiment, the second cover element 28b may comprise a rigid or a semi-rigid material. The second cover element 28b may also include the release coating 64 on at least one side for facilitating removal from the second adhesive layer 30b, while remaining coupled to the first adhesive layer 30a. In other words, the first cover element 28a may comprise a different material than the second cover element 28b. In this embodiment, the seed panel 20 is removed from the packaging 58 and the packaging 58 may continue to be used, e.g. protecting a compact disc, after the seed panel 20 is removed. It is to be appreciated that other embodiments the additional layers 22 may not necessarily be required to allow the packaging 58 to be reused after removal of the seed panel 20.

Referring specifically to FIGS. 11 and 13. The packaging 58 is typically formed in a flat state with creases 66 formed between the base 60 and the wings 62. The wings 62 are folded along the creases 66 and toward the base 60 to form the three-dimensional structure.

Figure 14:
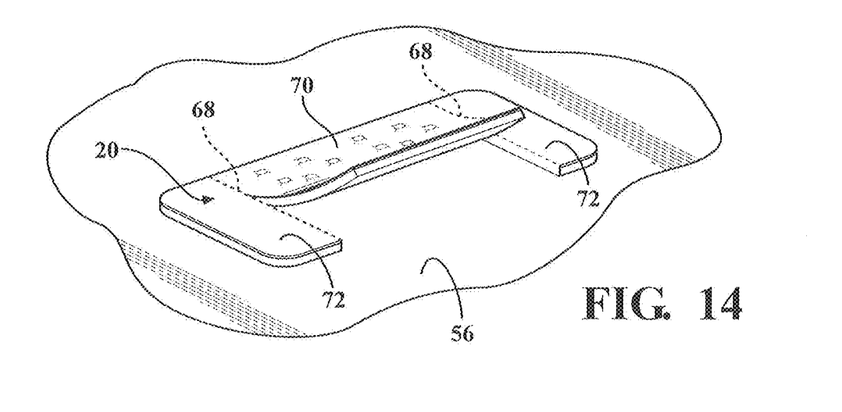
FIG. 14 is a perspective view of another embodiment of the seed panel partially removed from packaging.

With reference to FIG. 14, the seed panel 20 may include perforations 68. The perforations 68 divides the seed panel 20 into a central portion 70 and a plurality of outer portions 72. In this embodiment, the seed panel 20, including the central portion 70 and the outer portions 72 are affixed to the packaging 58. The central portion 70 may be torn from the outer portions 72 along the perforations 68 to remove the central portion 70 from the packaging 58. After being removed from the packaging 58, the central portion 70 functions as the seed panel 20, as described above. The cover element 28 may be peeled away from the substrate element 26 to expose the seed layer 24 in preparation for planting.

The present disclosure also contemplates a method of forming the seed panel 20. The method may include the step of providing a substrate element 26. The method may also include the step of providing an adhesive. The adhesive may be applied, for example, by spraying, rolling, sheeting, filming, etc. The method may also include the step of applying the adhesive to the substrate to form an adhesive layer 30. The method may also include the step of providing at least one seed. The method may also include the step of applying the seed to the adhesive layer 30. The method may also include the step of providing a cover element 28. The method may also include the step of applying the cover element 28 over the seed and substrate element 26. The method may also include the step of applying pressure to adhere the substrate element 26 to the cover element 28 for securing the seed therebetween. The method may also include the step of applying heat for promoting adhesion of the substrate element 26 and the cover element 28. The method may also include the step of cutting the composite of the packaging 58 to form the seed panel 20.

Also contemplated herein is a method of forming a plantable structure. Utilizing any of the examples previously described in which the cover element 28 is a release layer, the method comprises removing the release layer from the composite article. In an example, at least a portion of the release layer is removed. In another example, the entire release layer is removed. The release layer may be removed, for instance, by peeling the release layer off the substrate element 26. It is to be understood that the seed(s) 24 are exposed when the release layer is removed.

After the release layer has been removed, a remaining portion of the composite article is adhered to a secondary article, e.g., a cup, a box, a book mark, a business card, a carton, an envelope, a compact disc sleeve, a packaging, etc. The remaining portion of the composite article includes the substrate element 26, the adhesive layer 30 disposed on the substrate element 26, and the seed(s) 24 abutting the adhesive layer 30. In an example, the remaining portion of the composite article is adhered to the secondary article by placing the adhesive layer 30 of the remaining portion of the composite article in contact with a surface of the secondary article (e.g., to the bottom of a cup, to the side of a box, etc.). In some instances, pressure may be applied to adhere (by virtue of the adhesive in the adhesive layer 30) the remaining portion of the composite article to the secondary article.

The present disclosure further contemplates a method of planting seed with the seed panel 20. As described above, the seed panel comprises the substrate element 26 and the cover element 28 spaced from the substrate element 26. The adhesive layer 30 is disposed between and couples the cover element 28 and the substrate element 26 to one another. At least one seed is disposed between the elements 26, 28 and abuts the adhesive layer 30. The seed panel 20 may be removably coupled to a secondary structure. The method may include the step of removing the seed panel 20 from the secondary structure. The method may further include the step of separating the elements 26, 28 apart to expose the seed of the seed layer 24. The method may further include the step of soaking the seed panel 20 in a solution to facilitate separation of the elements 26, 28. The method may further include the step of disposing at least one of the elements 26, 28 having at least one seed disposed thereon in or on a growing medium to plant the seed. The method may further include the step of applying water to the seed and growing medium to facilitate germination of the seed. The terms "disposing the elements" may be further define as placing at least one of the elements 26, 28 with the seed disposed thereon atop the growing medium. Alternatively, the terms "disposing the elements" may be further define as placing at least one of the elements 26, 28 with the seed disposed thereon within the growing medium. It is to be appreciated that the growing medium is not particularly limited, and may include, but is not limited to, soil, dirt, gel, peat, sand, wood residues, hydroponic media, or any other suitable material.

Another example of a method for planting at least one seed with a composite article utilizes any of the examples of the composite article described above that utilizes a release layer as the cover element 28. The method comprises removing the release layer from the composite article, e.g., via peeling, as described above. The remaining portion of the composite article (again, which includes the substrate element 26, the adhesive layer 30, and the seed(s) 24) is adhered to a secondary article, as also described above. The seed(s) 24 is/are planted by disposing the secondary article having the remaining portion of the composite article adhered thereto in or on a growing medium, such as dirt or soil. After the seed(s) 24 is/are planted, water may be applied to the growing medium to germinate the seed(s) 24.

Referring now to FIGS. 15-21, examples of a packaging structure 100, 200, 300, 400 are shown and described below. It is to be understood that each of the FIGS. 15-20 are schematic and are not necessarily drawn to scale.

Figures 15, 16:
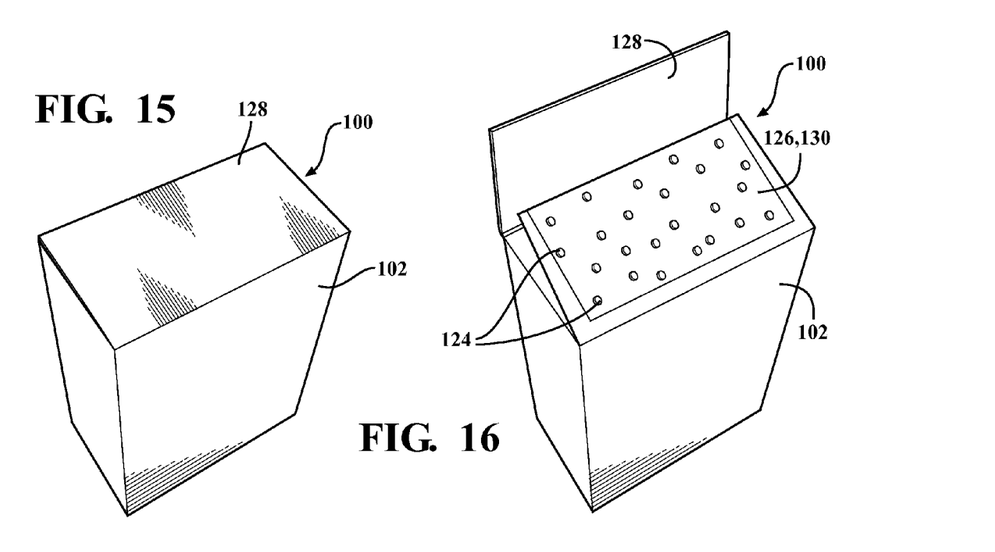
FIG. 15 is a perspective view of an example of a packaging structure.
FIG. 16 is a perspective view of the packaging structure of FIG. 15 with a first piece of a structural element separated from a second piece thereby exposing a plurality of seeds.
Figure 17:
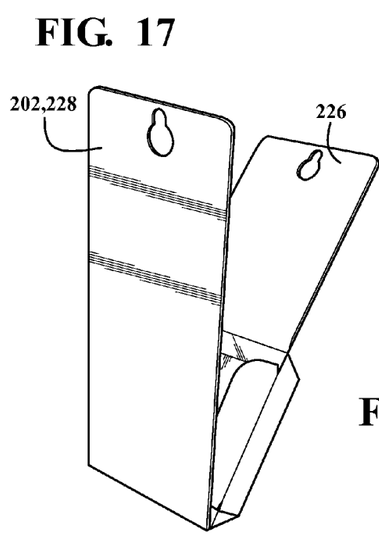
FIG. 17 is a perspective view of a structural element for another example of a packaging structure.
Figure 18:
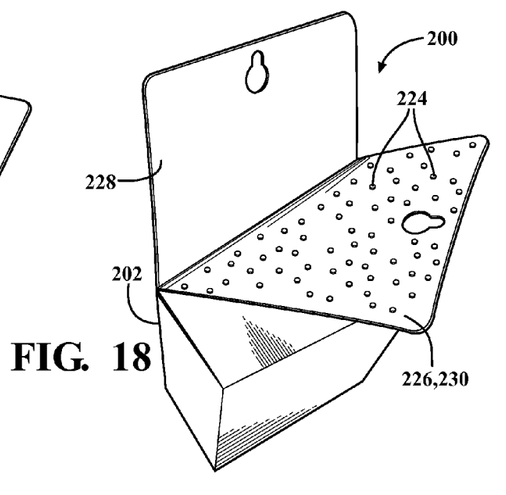
FIG. 18 is a perspective view of the packaging structure including the structural element of FIG. 17 with a first piece of a structural element separated from a second piece thereby exposing a plurality of seeds.

The packaging structure 100, 200, 300, 400 generally includes a structural element 102, 202, 302, 402 that may be a packaging for a product, an item, a good, and/or the like. The structural element 102, 202, 302, 402 may take any form or shape, such as a box (as shown in FIGS. 15 and 16), a box with a hanging label (as shown in FIGS. 17 and 18), or a carton (as shown in the examples depicted in FIGS. 19-21). The structural element 102, 202, 302, 402 may be made from any suitable packaging material. In an example, the structural element 102, 202, 302, 402 is made from a packaging material that is biodegradable.

In the example of the packaging structure 100 shown in FIGS. 15 and 16, the structural element 102 is a box that includes a first piece 128 that at least partially overlaps a second piece 126. An adhesive layer 130 is disposed between the first 128 and second 126 pieces to join the first 128 and second 126 pieces to one another. In the example depicted in FIG. 16, the adhesive layer 130 is disposed on the second piece 126. Any of the examples of the adhesive layer 130 described above may be used. Alternatively, any adhesive commonly used for packages (i.e., in packaging) may be used.

At least one seed 124 is disposed between the first 128 and second 126 pieces of the structural element 102. A plurality of seeds 124 are shown in FIG. 15. The seed(s) 124 may be chosen from any of the seeds as previously described, and in the example depicted in FIG. 16, the seed(s) 124 abut the adhesive layer 130 that is disposed on the second piece 126.

It is to be understood that the first piece 128 is separable from the second piece 126, as shown in FIG. 16, and at least the portion of the packaging structure 100 including the seed(s) 124 is configured to be planted in or on a growing medium. More specifically, and with reference to FIG. 15, the seed(s) 124 may be planted by removing the first piece 128 from the second piece 126 to expose the seed(s) 124. Removing of the first piece 128 may be accomplished by peeling, prying, tearing, or otherwise separating the first piece 128 form the second piece 126. Then, the second piece 126, which includes the adhesive layer 130 and the seed(s) 124 abutting the adhesive layer 130, is detached from the packaging structure 100. Detaching may be accomplished, for example, by tearing, cutting, or the like to completely detach the second piece 126 from the packaging structure 100. The second piece 126, which again includes the adhesive layer 130 and the seed(s) 124, may be disposed in a growing medium (e.g., dirt or soil) to plant the seed(s) 124.

Another example of the packaging structure 200 will be described with reference to FIGS. 17 and 18. In this example, the structural element 202 of the packaging structure 200 includes a box with a hanging label. In this example, the hanging label includes a first piece 228 and a second piece 226. As shown in FIG. 18, an adhesive layer 230 is disposed on the second piece 226, and at least one seed 224 abuts the adhesive layer 230. The seed(s) 224 may be planted, for example, by separating the first piece 228 from the second piece 226. In the example depicted in FIG. 18, the first piece 228 may be peeled away from the second piece 226, or visa versa, to expose the seed(s) 224. The second piece 226, which includes the adhesive layer 230 and the seed(s) 224, is detached from the packaging structure 200, and may be disposed in or on a growing medium.

Figure 19:
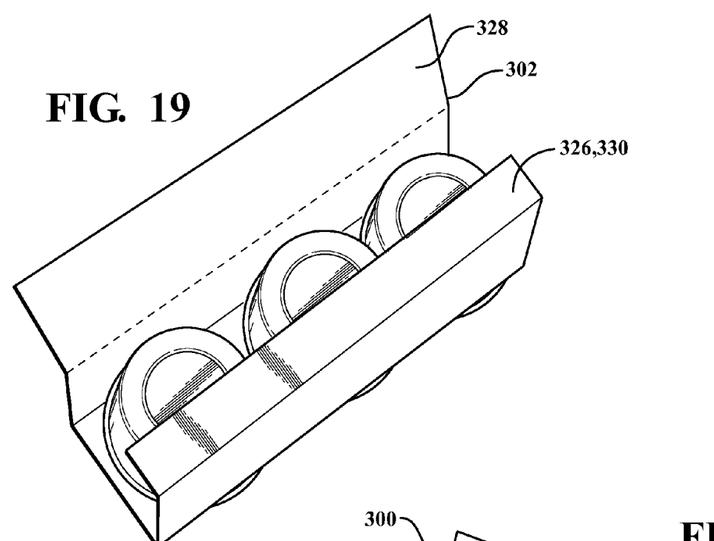
FIG. 19 is a perspective view of a structural element of another example of a packaging structure.
Figures 20, 21:
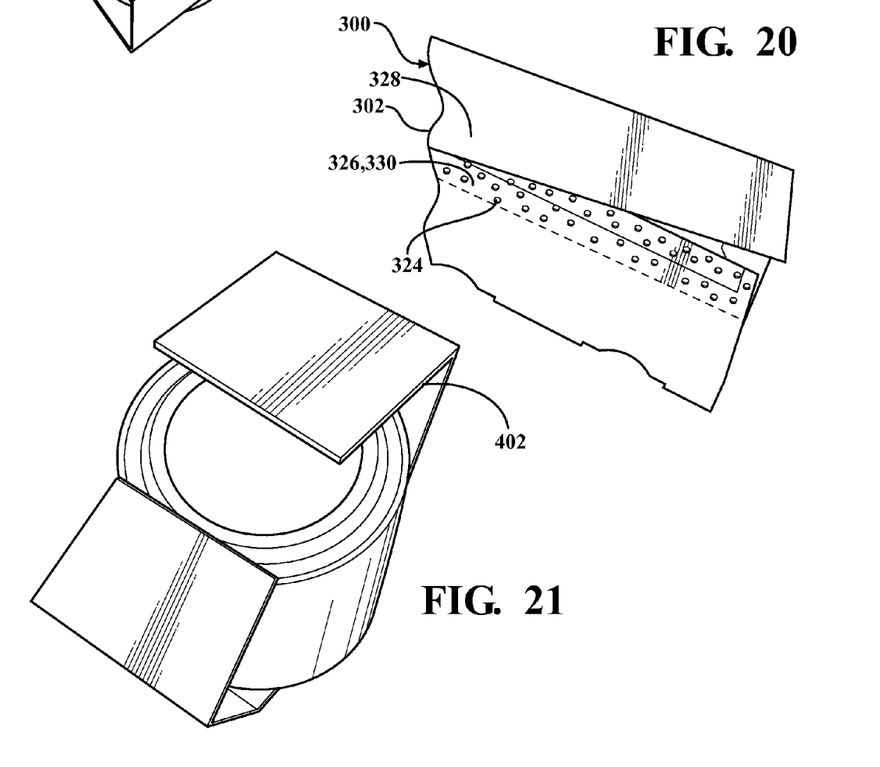
FIG. 20 is a perspective view of the packaging structure including the structural element of FIG. 19 with a first piece of a structural element separated from a second piece thereby exposing a plurality of seeds.
FIG. 21 is a perspective view of another example of a structural element for a packaging structure.

Another example of a packaging structure 300 will be described with reference to FIGS. 19 and 20. In this example, the packaging structure 300 is a carton that includes a structural element 302 having a first piece 328 that overlaps a second piece 326. In the example depicted in FIGS. 19 and 20, the first piece 328 does not completely overlap the second piece 326.

An adhesive layer 330 is disposed on the second piece 326 and at least one seed 324 abuts the adhesive layer 330. The seed(s) 324 may be planted, for example, by separating the first piece 328 from the second piece 326. In the example depicted in FIG. 20, the first piece 328 may be peeled away from the second piece 326 to expose the seed(s) 324. The second piece 326, which includes the adhesive layer 330 and the seed(s) 324, is detached from the packaging structure 300, and may be disposed in or on a growing medium.

It is to be understood that any of the packaging structure 100, 200, 300 may be provided in any size. For instance, as shown in FIG. 21, structural element 402 taking the form of a carton may be smaller than the carton 302 shown and described with reference to FIGS. 19 and 20. Additionally, although a portion of the packaging structure 100, 200, 300 (i.e., the second piece 126, 226, 326) may be disposed in or on a growing medium, it is also contemplated herein to disposed the entire packaging structure 100, 200, 300. In this instance, the second piece 126, 226, 326 is not detached from the packaging structure 100, 200, 300.

Also disclosed herein is a method of forming a packaging structure. The method involves providing a structural element 102, 202, 302 having first 128, 228, 328 and second 126, 226, 326 pieces, applying an adhesive layer 130, 230, 330 to the second piece 126, 226, 326, applying at least one seed 124, 224, 324 to the adhesive layer 130, 230, 330, and then applying the first piece 128, 228, 328 to the adhesive layer 130, 230, 330, thereby encapsulating the seed(s) 130, 230, 330. In an example, pressure may be applied to adhere the first 128, 228, 328 and second 126, 226, 326 pieces together.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that reference numerals are merely for convenience and are not to be in any way limiting, the invention may be practiced otherwise than as specifically described.

What is claimed is:

1. A method of forming a plantable structure, said method comprising the steps of:
   providing a composite article that comprises a substrate element, a release layer spaced from the substrate element, an adhesive layer disposed between the substrate element and the release layer, and at least one seed abutting the adhesive layer, wherein the at least one seed is coupled to the substrate element through the adhesive layer;
   removing the release layer from the composite article forming a remaining portion of the composite article comprising the substrate element, the adhesive layer disposed on the substrate element, and the at least one seed abutting the adhesive layer; and
   adhering the remaining portion of the composite article to a secondary article.

2. The method as set forth in claim 1 wherein said removing of the release layer from the composite article comprises peeling the release layer off the substrate element.

3. The method as set forth in claim 1 wherein the release layer is a coated paper product.

4. The method as set forth in claim 3 wherein the coated paper product comprises paper coated with at least one silicone.

5. The method as set forth in claim 1 wherein the adhesive layer is a water-based adhesive.

6. The method as set forth in claim 1 wherein the substrate element is a fiberboard, a cardboard, a cardstock, a sheet of paper, a fiber, a recycled newsprint, and combinations thereof.

7. The method as set forth in claim 1 wherein the secondary article is a cup, a box, a book mark, a business card, a carton, an envelope, a compact disc sleeve, a packaging, a bottle hand tag, or a price tag.

8. A method of planting at least one seed with a composite article, the composite article comprising a substrate element, a release layer spaced from the substrate element, an adhesive layer disposed between the substrate element and the release layer, and at least one seed abutting the adhesive layer, wherein the at least one seed is coupled to the substrate element through the adhesive layer, said method comprising the steps of:

removing the release layer from the composite article forming a remaining portion of the composite article comprising the substrate element, the adhesive layer disposed on the substrate element, and the at least one seed abutting the adhesive layer;

adhering the remaining portion of the composite article to a secondary article; and disposing the secondary article having the remaining portion of the composite article adhered thereto in or on a growing medium to plant the at least one seed.

9. The method as set forth in claim 8 wherein said removing of the release layer is defined as peeling the release layer off of the adhesive layer.

10. The method as set forth in claim 8 further comprising applying water to the growing medium to germinate the at least one seed.

11. The method as set forth in claim 8 wherein the growing medium comprises soil or dirt.

* * * * *